United States Patent
Salter et al.

(10) Patent No.: US 12,236,805 B2
(45) Date of Patent: Feb. 25, 2025

(54) DIDACTIC VIDEOS FOR VEHICLE OPERATION

(71) Applicant: Ford Global Technologies, LLC, Dearborn, MI (US)

(72) Inventors: Stuart C. Salter, White Lake, MI (US); Pietro Buttolo, Dearborn Heights, MI (US); Mike Kipley, Saline, MI (US); Laura Symington, Royal Oak, MI (US); David Kennedy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 824 days.

(21) Appl. No.: 17/479,024

(22) Filed: Sep. 20, 2021

(65) Prior Publication Data

US 2023/0088122 A1 Mar. 23, 2023

(51) Int. Cl.
| | |
|---|---|
| G09B 9/05 | (2006.01) |
| G06F 16/483 | (2019.01) |
| G06Q 50/20 | (2012.01) |
| H04N 21/472 | (2011.01) |
| H04N 21/84 | (2011.01) |

(52) U.S. Cl.
CPC .............. *G09B 9/05* (2013.01); *G06F 16/483* (2019.01); *G06Q 50/20* (2013.01); *H04N 21/472* (2013.01); *H04N 21/84* (2013.01)

(58) Field of Classification Search
CPC ..... G06F 16/483; H04N 21/84; H04N 21/472
See application file for complete search history.

(56) References Cited

U.S. PATENT DOCUMENTS

| | | | |
|---|---|---|---|
| 9,324,373 B2 | 4/2016 | Chakra et al. | |
| 10,397,662 B1 | 8/2019 | Bulusu et al. | |
| 2011/0171612 A1* | 7/2011 | Gelinske | G09B 9/08 434/35 |
| 2011/0306395 A1* | 12/2011 | Ivory | A63F 13/49 463/43 |
| 2011/0320066 A1* | 12/2011 | Schofield | B60R 1/12 348/148 |
| 2013/0094697 A1 | 4/2013 | Adcock et al. | |
| 2015/0030998 A1* | 1/2015 | Liu | G09B 9/048 434/62 |
| 2015/0050623 A1* | 2/2015 | Falash | G09B 7/00 434/362 |
| 2017/0010903 A1 | 1/2017 | Kidron et al. | |
| 2018/0151088 A1* | 5/2018 | Tan | G06V 20/597 |
| 2019/0147259 A1* | 5/2019 | Molin | G06F 16/783 382/104 |
| 2021/0065275 A1* | 3/2021 | Denthumdas | B60K 35/10 |
| 2021/0227195 A1* | 7/2021 | Holzer | G11B 27/031 |

* cited by examiner

*Primary Examiner* — Jay Trent Liddle
*Assistant Examiner* — Alyssa N Brandley
(74) *Attorney, Agent, or Firm* — Christopher Storms; Brooks Kushman P.C.

(57) ABSTRACT

A computer includes a processor and a memory storing instructions executable by the processor to record a first video of inputs to respective controls of a user interface of a vehicle, add metadata to the first video of respective times at which the respective inputs are provided, and generate a second video based on the first video and the metadata. The second video shows the user interface and highlights the respective controls corresponding to the respective inputs at the respective times.

18 Claims, 6 Drawing Sheets

DIDACTIC VIDEOS FOR VEHICLE OPERATION

BACKGROUND

Modern vehicles are typically equipped with a wealth of features that users can control and customize such as climate zones, adaptive cruise control, media inputs, modes of automatic gear shifting, and many others. The user controls and customizes these features through a user interface. The user interface presents information to and receives information from the user. The user interface includes controls located on an instrument panel in a passenger cabin of the vehicle as well as elsewhere in the passenger cabin. The user interface may include dials, digital readouts, screens, and speakers for providing information to the user. The user interface may include buttons, knobs, keypads, touchscreens, microphones, and so on for receiving information from the user.

DETAILED DESCRIPTION

Figure 1:
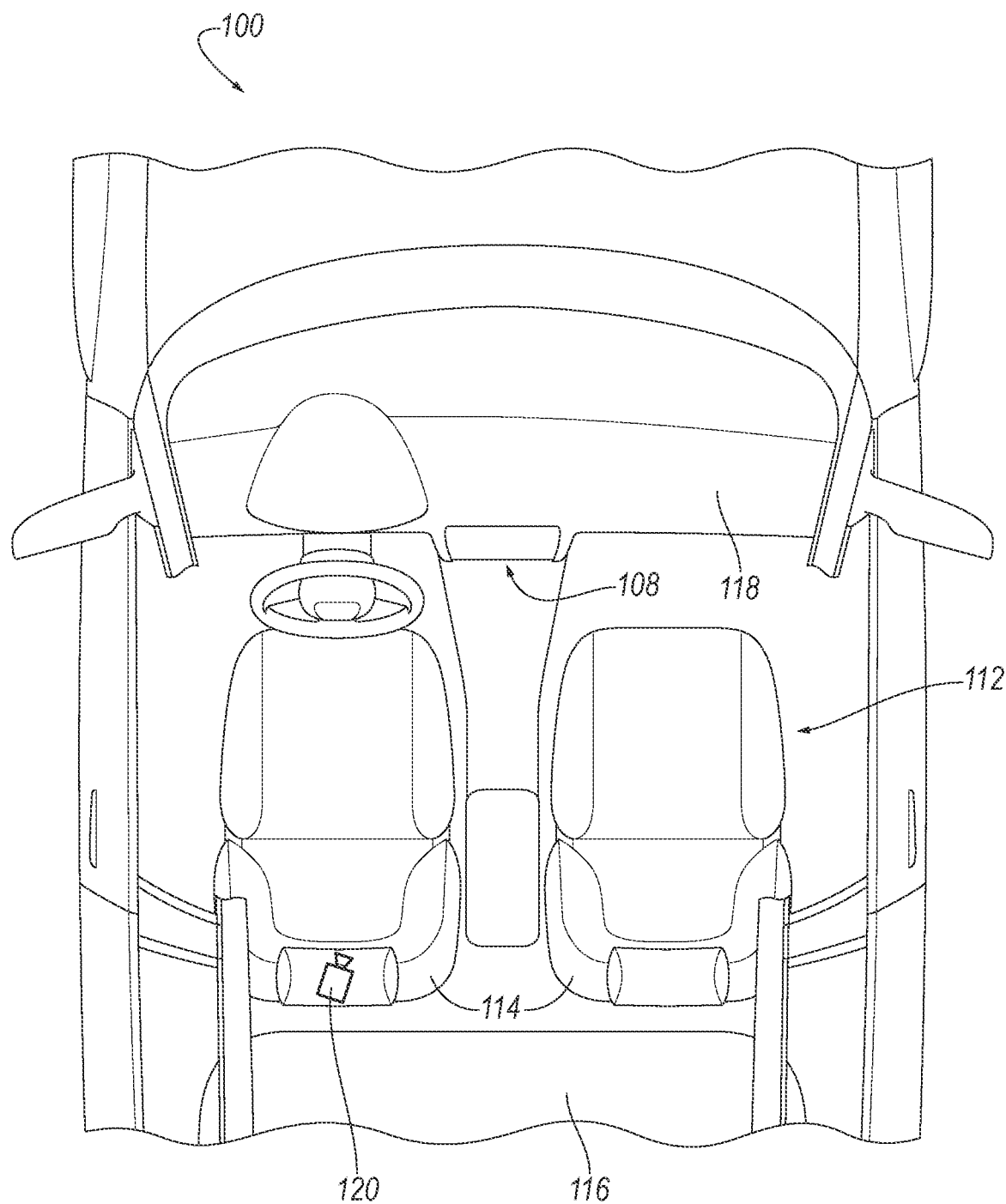
FIG. 1 is a top view of an example vehicle with a passenger cabin exposed for illustration.

Modern vehicles are typically equipped with a wealth of features that users can control and customize through a user interface of the vehicle. Because of the large number of settings and options accessible through the user interface may lack clear organization and/or ready accessibility. This disclosure provides techniques to generate and deliver didactic files that can include didactic videos for operating different features of the vehicle. The didactic files can deliver multiple formats so that the user can select a format most helpful for them, e.g., a first video showing another user providing inputs to the controls of the user interface of the vehicle to access the feature and a second video showing the user interface and highlighting the respective controls as the user selects them, e.g., with the user interface unobstructed by the other user. In some examples, the didactic file can also include a macro. The multiformat didactic file may be more usable than a single-format file of the first video. Moreover, the second video is generated by recording the first video and adding metadata of the respective times at which the respective inputs are provided, thus providing a possibly more usable didactic video. For at least these reasons, the techniques herein provide improved files documenting vehicle features.

A computer includes a processor and a memory storing instructions executable by the processor to record a first video of inputs to respective controls of a user interface of a vehicle, add metadata to the first video of respective times at which the respective inputs are provided, and generate a second video based on the first video and the metadata. The second video shows the user interface and highlights the respective controls corresponding to the respective inputs at the respective times.

The instructions may further include instructions to receive the metadata of the times from a communications network of the vehicle.

The second video may show the user interface unobstructed by a user who provided the inputs.

The first video may include audio recorded of a user who provided the inputs. The second video may include the audio from the first video.

The instructions may further include instructions to generate a macro of the respective inputs at the respective times. The instructions may further include instructions to receive a selection of at most one of the second video or the macro, play the second video upon receiving the selection selecting the second video, and execute the macro upon receiving the selection selecting the macro. The selection may be of at most one of the second video, the macro, and the first video, and the instructions may further include instructions to play the first video upon receiving the selection selecting the first video.

The instructions may further include instructions to play the second video and, while playing the second video, pause the second video at the times. The instructions may further include instructions to, when the second video is paused at a first time of the times, unpause the second video upon receiving a first input that is the same as received at the first time while recording the first video.

The instructions may further include instructions to, when the second video is paused at a first time of the times, replay a previous portion of the second video upon receiving a second input that is different than a first input received at the first time while recording the first video.

The instructions may further include instructions to receive a selection from a user of at most one of the first video or the second video, play the first video upon receiving the selection selecting the first video, and play the second video upon receiving the selection selecting the second video.

The inputs may be first inputs, and the instructions may further include instructions to receive second inputs, and output a prompt to view the second video based on the second inputs. The second inputs may be commands other than to view the second video.

The instructions may further include instructions to select the second video from a video library based on the second inputs. Selecting the second video from the video library may include executing a trained network on the second inputs. The trained network may be trained to identify a command that a user intended to select and failed to select with the second inputs, and selecting the second video is based on the command.

The instructions may further include instructions to, upon generating the second video, upload the second video to the video library that is remote from the vehicle.

The controls may include at least one of a button, a knob, and a portion of a touchscreen.

A method includes recording a first video of inputs to respective controls of a user interface of a vehicle, adding metadata to the first video of respective times at which the respective inputs are provided, and generating a second video based on the first video and the metadata. The second video shows the user interface and highlights the respective controls corresponding to the respective inputs at the respective times.

With reference to the Figures, wherein like numerals indicate like parts throughout the several views, a computer 102, 104, 106 includes a processor and a memory storing instructions executable by the processor to record a first video of inputs to respective controls 110 of a user interface 108 of a vehicle 100, add metadata to the first video of respective times at which the respective inputs are provided, and generate a second video based on the first video and the metadata. The second video shows the user interface 108 and highlights the respective controls 110 corresponding to the respective inputs at the respective times. The computer 102, 104, 106 can be one or more of a vehicle computer 102 of the vehicle 100, a mobile device 104 of the user, and/or a server 106 remote from the vehicle 100.

With reference to FIG. 1, the vehicle 100 may be any suitable type of ground vehicle, e.g., a passenger or commercial automobile such as a sedan, a coupe, a truck, a sport utility, a crossover, a van, a minivan, a taxi, a bus, etc.

The vehicle 100 includes a passenger cabin 112 to house occupants, if any, of the vehicle 100. The passenger cabin 112 includes one or more front seats 114 disposed at a front of the passenger cabin 112 and one or more back seats 116 disposed behind the front seats 114. The passenger cabin 112 may also include third-row seats (not shown) at a rear of the passenger cabin 112.

The passenger cabin 112 may include an instrument panel 118 disposed at a vehicle-forward end of the passenger cabin 112. The instrument panel 118 may support the controls 110 of the user interface 108, including a steering wheel. The instrument panel 118 may extend across the front end of the passenger cabin 112 from one side of the vehicle 100 to the other side of the vehicle 100.

The vehicle 100 can include a camera 120 in the passenger cabin 112. The camera 120 can detect electromagnetic radiation in some range of wavelengths. For example, the camera 120 may detect visible light, infrared radiation, ultraviolet light, or some range of wavelengths including visible, infrared, and/or ultraviolet light. For example, the camera 120 can be a charge-coupled device (CCD), complementary metal oxide semiconductor (CMOS), or any other suitable type. The camera 120 can be positioned to have a field of view encompassing the instrument panel 118 and a user seated in one of the front seats 114.

The vehicle 100 includes at least one microphone 122. The microphone 122 is a transducer that converts sound to an electrical signal. The microphone 122 can be any suitable type, e.g., a dynamic microphone, which includes a coil of wire suspended in a magnetic field; a condenser microphone, which uses a vibrating diaphragm as a capacitor plate; a contact microphone, which uses a piezoelectric crystal; etc. The microphone 122 can be positioned to detect sound produced in the passenger cabin 112, e.g., by the user speaking.

Figure 2:
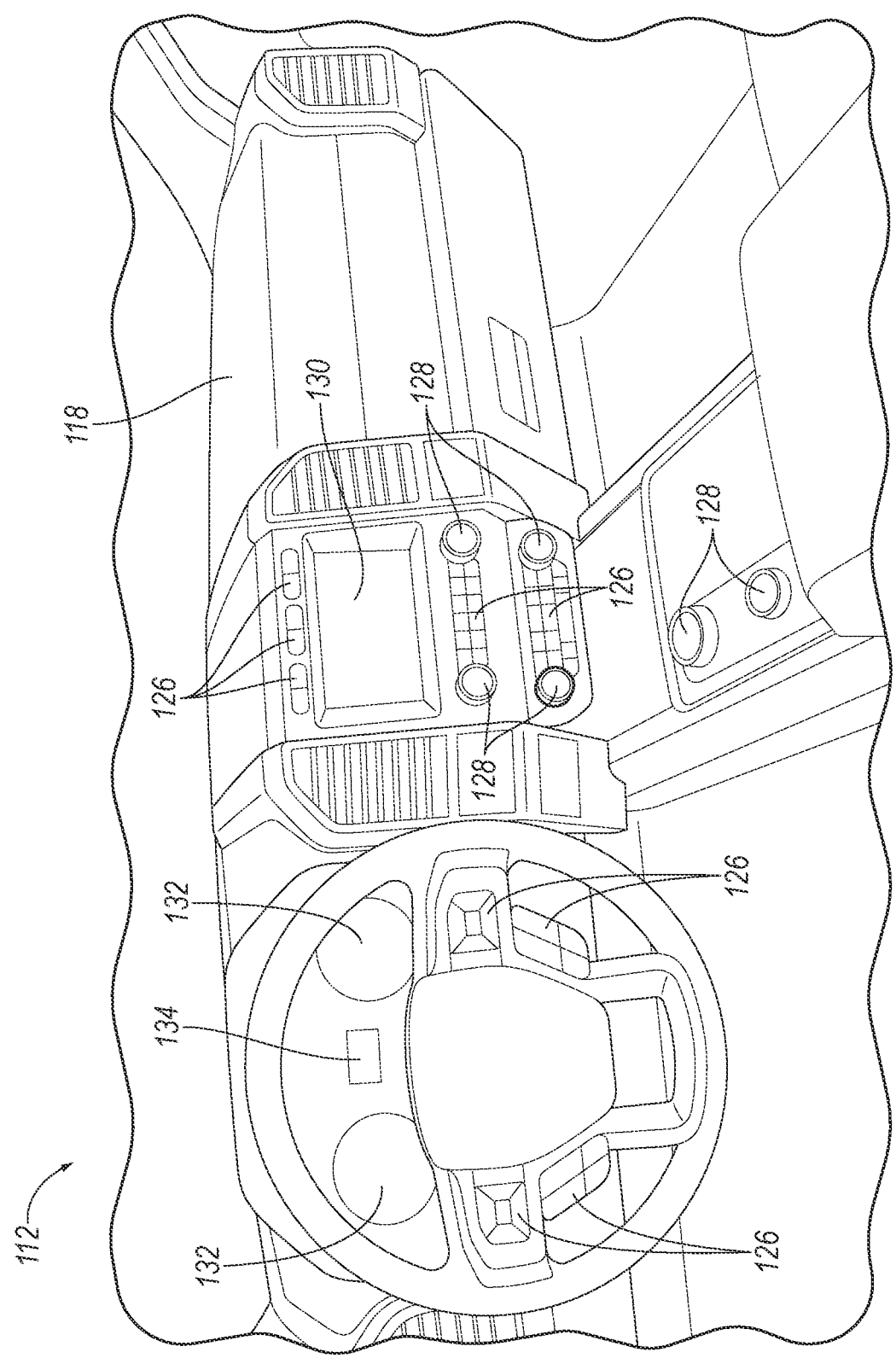
FIG. 2 is a perspective view of an example instrument panel of the vehicle.

With reference to FIG. 2, the user interface 108 presents information to and receives information from the user seated in the passenger cabin 112. The user interface 108 includes the controls 110 and outputs 124 that may be located, e.g., on an instrument panel 118 in a passenger cabin 112 of the vehicle 100, or wherever may be readily used or perceived by the occupant. The controls 110 may include buttons 126, knobs 128, keypads, a touchscreen 130, the microphone 122, and so on for receiving information from the user. The touchscreen 130 may display virtual buttons, menu options, slider bars, etc. that occupy portions of the touchscreen 130 and may be selected by the user by touching the touchscreen 130. The outputs 124 may include dials 132, digital readouts 134, screens including the touchscreen 130, speakers, vibrators for haptic feedback, and so on for providing information to the user, e.g., human-machine interface (HMI) elements such as are known.

The user provides inputs to operate features of the vehicle 100 via the controls 110. Each input is provided by the user performing an action on one of the controls 110, e.g., pressing, turning, adjusting, touching, etc. For example, pressing a button 126 may activate a voice control mode permitting the user to speak a command; turning a knob 128 may adjust a desired temperature of the passenger cabin 112 for a climate-control system; touching portions of the touchscreen 130 in a particular sequence may sync the mobile device 104 and select media on the mobile device 104 to play on the user interface 108; and so on.

Figure 3:
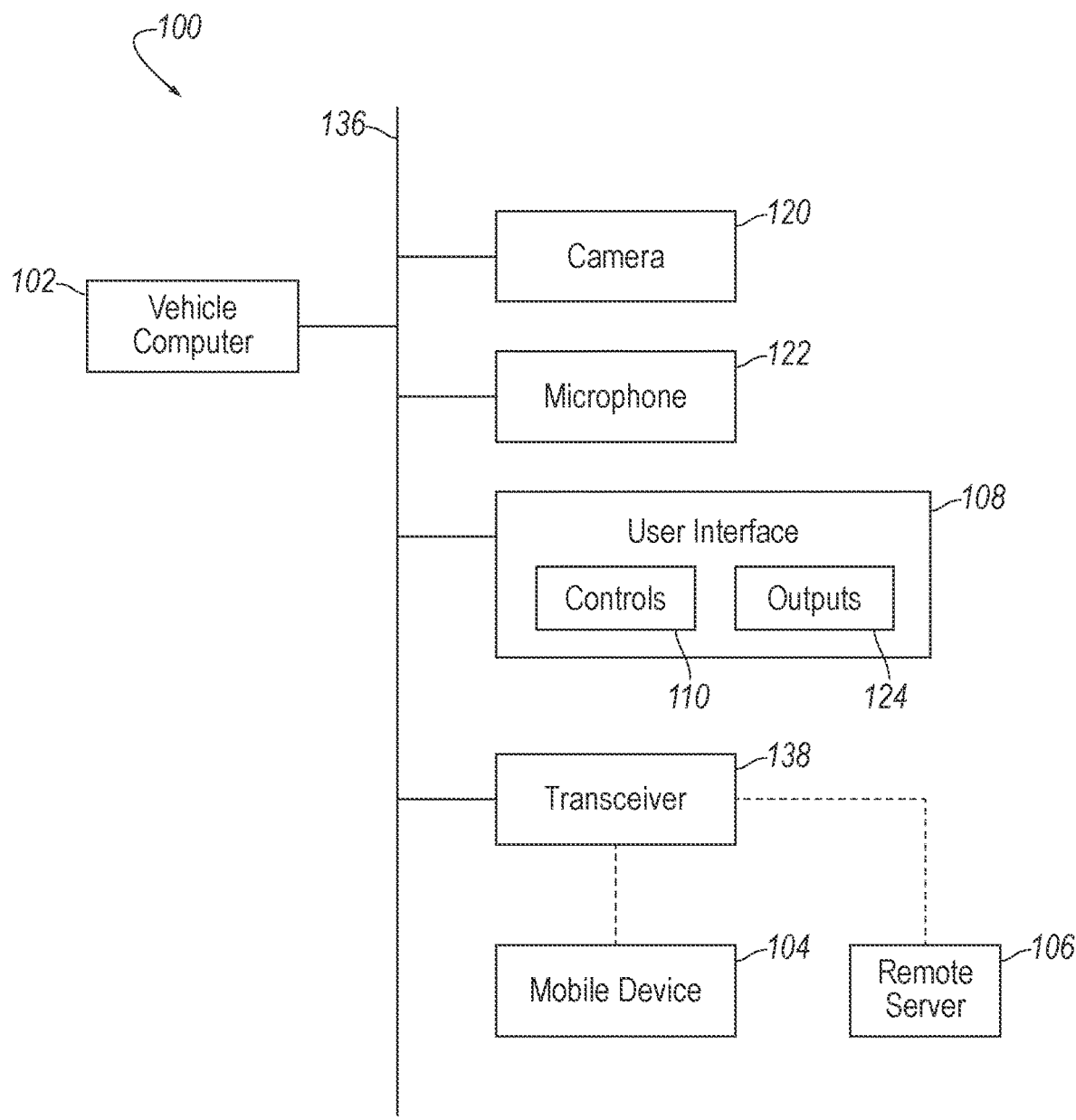
FIG. 3 a block diagram of the vehicle.

With reference to FIG. 3, the vehicle computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The vehicle computer 102 can thus include a processor, a memory, etc. The memory of the vehicle computer 102 can include media for storing instructions executable by the processor as well as for electronically storing data and/or databases, and/or the vehicle computer 102 can include structures such as the foregoing by which programming is provided. The vehicle computer 102 can be multiple computers coupled together within the vehicle 100.

The vehicle computer 102 may transmit and receive data through a communications network 136 such as a controller area network (CAN) bus, Ethernet, WiFi, Local Interconnect Network (LIN), onboard diagnostics connector (OBD-II), and/or by any other wired or wireless communications network. The vehicle computer 102 may be communicatively coupled to the user interface 108, the camera 120, the microphone 122, a transceiver 138, and other components via the communications network 136.

The transceiver 138 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 138 may be adapted to communicate with a remote server, that is, a server distinct and spaced from the vehicle 100. The remote server may be located outside the vehicle 100. For example, the remote server may be associated with another vehicle 100 (e.g., V2V communications), an infrastructure component (e.g., V2I communications), an emergency responder, the mobile device 104 associated with the user, the server 106 for providing service to a fleet of vehicles 100 including the vehicle 100, etc. The transceiver 138 may be one device or may include a separate transmitter and receiver.

The mobile device 104 is a portable computing device such as a mobile phone, e.g., a smartphone, or a tablet. The mobile device 104 is a computing device including a processor and a memory. The mobile device 104 can be equipped with a camera and/or a microphone. The mobile device 104 is owned and carried by a person who may be the operator or owner of the vehicle 100. The mobile device 104 can communicate with the vehicle computer 102 via the transceiver 138 and with the server 106 via one or more networks.

The server 106 may be a cloud computing location for receiving and providing data to a fleet of vehicles 100 including the vehicle 100. For example, the server 106 can be operated by a manufacturer or seller of vehicles 100 including the vehicle 100 or a fleet operator of a fleet including the vehicle 100.

As will now be described, a first user in a vehicle 100 can take actions initiating generation of a didactic file that can be employed by a second user in a different vehicle 100. This begins with the first user selecting an option to instruct the computer 102, 104, 106 to record a first video. For example, the first user can provide an input to one or more controls 110 of the user interface 108, and the vehicle computer 102 can record the first video by receiving video data from the camera 120, as well as audio data from the microphone 122. Alternatively, the first user can provide an input to the mobile device 104 for the mobile device 104 to record the video, including video data and audio data.

The computer 102, 104, 106 records the first video of the first user providing respective inputs to the respective controls 110 of the user interface 108. The first user can provide a sequence of inputs to perform an operation of the vehicle 100, and the computer 102, 104, 106 can record the first video for the duration of the sequence of inputs. For example, the computer 102, 104, 106 can begin recording the first video, then the first user can provide inputs for setting a desired temperature for a climate zone of the passenger cabin 112, e.g., provide a first input by touching a portion of the touchscreen 130 to select a climate-control system, provide a second input by touching a portion of the touchscreen 130 to select the climate zone of the passenger cabin 112, and provide a third input by turning a knob 128 to the desired temperature, and then the first user can provide an input to the computer 102, 104, 106 to stop recording the first video. The first user can provide narration while providing the sequence of inputs, and the first video can include audio recorded of the user providing the narration.

The computer 102, 104, 106 adds metadata to the first video of respective times at which the respective inputs are provided. The times can become timestamps within the first video. The computer 102, 104, 106 can receive the metadata of the times from the communications network 136, either directly for the vehicle computer 102 or indirectly via the transceiver 138 for the mobile device 104 or the server 106. For example, as the vehicle computer 102 receives notifications from the communications network 136 for each input in turn, the vehicle computer 102 can store a time along with an identification of the input, e.g., a first time at which the first input was provided, a second time at which the second input was provided, a third time at which the third input was provided, etc. The times can be stored, e.g., as elapsed durations of the first video at which the inputs are provided.

Figure 4:
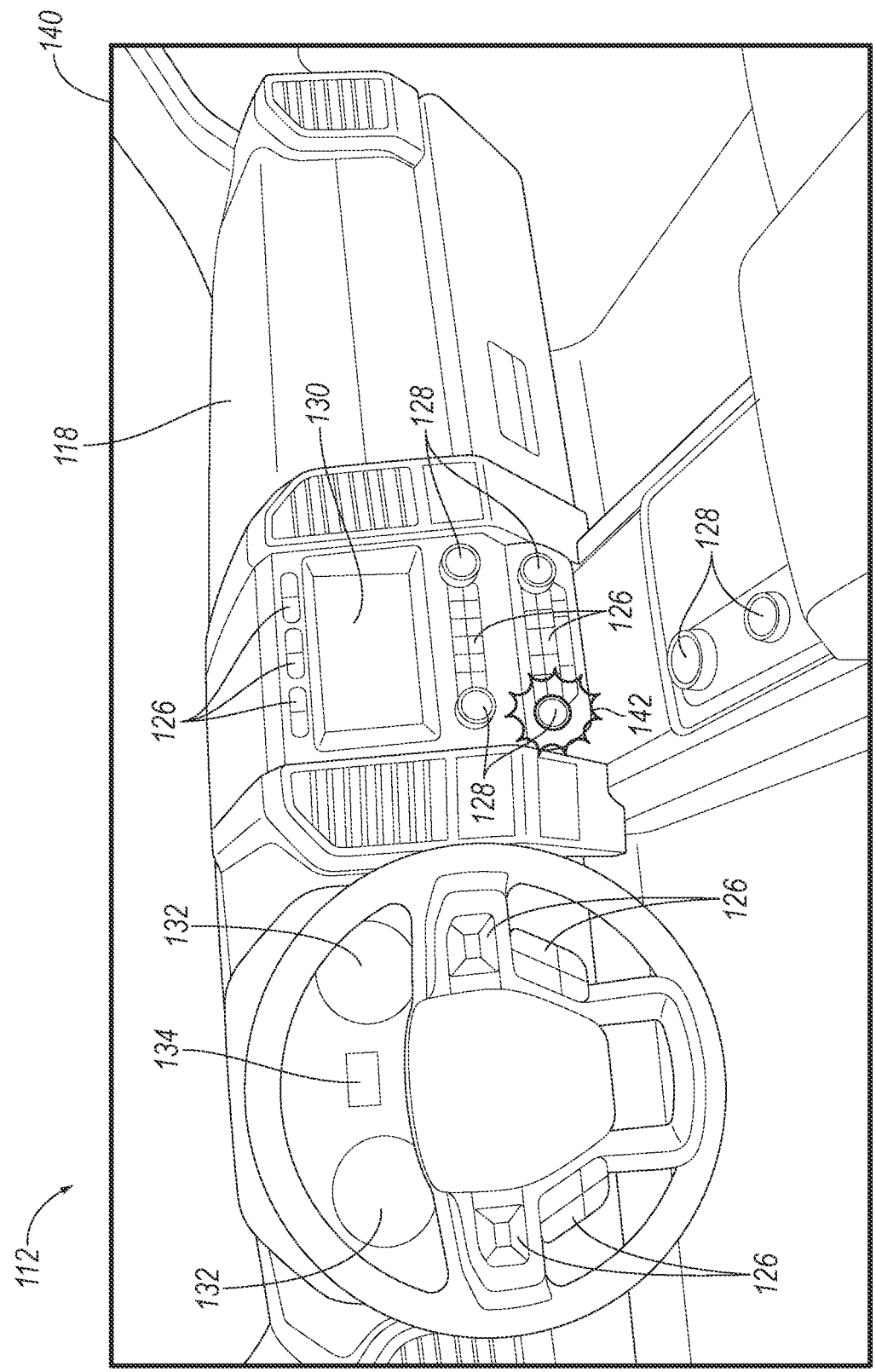
FIG. 4 is an example image frame from a video showing a perspective view of the instrument panel with a control highlighted.

With reference to FIG. 4, the computer 102, 104, 106 generates a second video based on the first video and the metadata. The second video shows the user interface 108 unobstructed by the first user. For example, the second video can show an image of the user interface 108 that is already stored in the memory of the computer 102, 104, 106, e.g., a perspective or plan view of the instrument panel 118 taken when no users were in the front seats 114 of the vehicle 100.

FIG. 4 shows an image frame 140 of the second video. The second video can be the same duration as the first video. The second video can include the audio recorded in the first video.

The second video includes highlighting of the respective controls 110 corresponding to the respective inputs at the respective times. For the purposes of this disclosure, "highlighting" is defined as applying a visual emphasis to a portion of an image frame of a video, e.g., filling in or surrounding one of the controls 110 with a bright color such as yellow, displaying an arrow pointing to one of the controls 110, showing a magnified version of one of the controls 110, etc. FIG. 4 shows a highlight 142 applied to one of the knobs 128 in the image frame 140. Continuing the climate-zone example from above, the second video can include highlighting of the portion of the touchscreen 130 for selecting the climate-control system at the first time, highlighting of the portion of the touchscreen 130 for selecting the climate zone at the second time, and highlighting of the knob 128 for turning to the desired temperature at the third time.

The computer 102, 104, 106 can also generate a macro of the respective inputs at the respective times. For the purposes of this disclosure, a "macro" is defined as a sequence of inputs that are automatically provided upon executing the macro. Continuing the climate-zone example from above, the macro can include selecting the climate-control system at the first time, selecting the climate zone at the second time, and selecting the desired temperature at the third time. Macros can be stored in the memory as tables with the inputs paired with the respective times.

The computer 102, 104, 106 can generate macros for a first subset of operations of the vehicle 100 and refrain from generating macros for a second subset of operations of the vehicle 100. The second subset can be all operations not in the first subset; in other words, the first and second subsets are mutually exclusive and exhaustive. The second subset can include safety-related systems. For example, adjusting the climate-control system and playing media can be in the first subset, and engaging and disengaging an adaptive cruise control can be in the second subset.

The computer 102, 104, 106 can consolidate one or more of the first video, the second video, and/or the macro into a didactic file. A plurality of the didactic files can be gathered and made available to the second user to choose from.

For example, the didactic files can be stored in a video library in the memory of the server 106. Upon generating the second video and/or the macro and consolidating the first video, the second video, and/or the macro into the didactic file, the computer 102, 104, 106 (e.g., the vehicle computer 102 or the mobile device 104) can upload the didactic file to the video library in the server 106. Thus, upon generating the second video, the computer 102, 104, 106 can upload the second video to the video library, and upon generating the macro, the computer 102, 104, 106 can upload the macro to the video library. Uploading the didactic file, e.g., the second video and/or the macro, can include transmitting the didactic file to the server 106, e.g., via the transceiver 138. The server 106 can store the video library for access by users of a fleet of vehicles 100.

The computer 102, 104, 106 can select the didactic file from the video library, and the computer 102, 104, 106 can then output a prompt to the second user to choose the didactic file, e.g., view the second video. For example, the second user can enter a keyword search of the video library, and the computer 102, 104, 106 can select a plurality of didactic files based on the keyword search and display those didactic files. The second user can then choose from the displayed didactic files. The computer 102, 104, 106 can output the didactic files as an ordered list. The order of the list can be, e.g., in descending order of scores of the didactic files. The scores can be based on a closeness of the didactic file to the keyword search, as is known, as well as on evaluations of the didactic files, as will be described below.

For another example, the computer 102, 104, 106 can receive inputs from the second user, select the didactic file from the video library based on the inputs from the second user, and then output a prompt to the second user to choose the didactic file, e.g., view the second video, based on the inputs from the second user. The inputs can be commands other than to choose the didactic file or view the second video. In other words, the computer 102, 104, 106 can output the prompt to the second user based on the second user attempting to perform some other action, e.g., unsuccessfully. The computer 102, 104, 106 can identify a command that the second user intended to select and failed to select with the inputs and then select the didactic file based on the command, e.g., select the didactic file for instructing the second user to successfully enter the command. As will now be described, selecting the didactic file based on the inputs from the second user can include executing a trained network, e.g., a neural network or other machine-learning program, on the inputs.

The trained network can take as input the inputs, including a sequence of the inputs and the times that the second user provided the inputs. For example, greater times increases a likelihood that the trained network outputs an intended command different than a command actually produced by the sequence of the inputs. The computer 102, 104, 106 can use a machine-learning algorithm for classifying items into a known number of categories, e.g., naive Bayesian, nearest neighbor, polynomial classifiers, artificial neural networks, etc.

The trained network can be trained on a training set of inputs, e.g., sequences and times of the inputs, and corresponding intended commands. The training set can be generated by having a plurality of users test the user interface 108 of the vehicle 100 while reporting what commands they are intending to perform.

The trained network can output an intended command, i.e., a command that is most likely to be what the second user intended by the sequence of the inputs. If the intended command outputted by the trained network is the same as a command actually produced by the sequence of the inputs, then the computer 102, 104, 106 may not prompt the second user to choose any didactic file. If the intended command is different than the command produced by the sequence of the inputs, then the computer 102, 104, 106 can prompt the second user to choose a didactic file for instructing the second user to successfully enter the intended command. If the video library includes multiple didactic files for the intended command, the computer 102, 104, 106 can choose the didactic file with a highest score based on the evaluations described below.

Once the second user has chosen a didactic file, the computer 102, 104, 106 can output a prompt for the second user to select one of, e.g., the first video, the second video, and the macro included in that didactic file. The second user may thus select at most one of the first video and the second video, at most one of the first video and the macro, and at most one of the second video and the macro. The computer 102, 104, 106 receives the selection from the second user.

Upon receiving the selection selecting the macro, the computer 102, 104, 106 can execute the macro, i.e., receive the inputs listed in the macro in the sequence defined by the macro and performing the commands associated with those inputs. The computer 102, 104, 106 can perform the commands associated with the inputs at the times if the times are included in the macro. The computer 102, 104, 106 can thus execute the macro at a speed slow enough for the second user to follow along.

Upon receiving the selection selecting the first video, the computer 102, 104, 106 can play the first video. Upon receiving the selection selecting the second video, the computer 102, 104, 106 can play the second video.

While playing the first or second video for the second user, the computer 102, 104, 106 can pause the first or second video at the times stored in the metadata of the first or second video, i.e., at the times that the first user provided the inputs while recording the first video. When the first or second video is paused at one of the times, the computer 102, 104, 106 can unpause the first or second video upon receiving an input that is the same as received at that time while recording the first video, i.e., upon receiving the input that the first or second video is instructing the second user to provide, i.e., upon receiving a correct input. When the first or second video is paused at one of the times, the computer 102, 104, 106 can replay a previous portion of the first or second video upon receiving an input that is different than received at that time while recording the first video, i.e., upon receiving an input other than what the first or second video is instructing the second user to provide, i.e., upon receiving an incorrect input. In other words, at each of the times, the computer 102, 104, 106 can pause the first or second video, replay a previous portion if the second user provides a different input than the first or second video is instructing them to provide, and continue playing the first or second video if the second user provides the input that the first or second video is instructing them to provide.

When the second user has completed the first or second video, the computer 102, 104, 106 can prompt the second user to provide an evaluation of the didactic file. For example, the computer 102, 104, 106 can provide an input evaluating the didactic file on a Likert scale, e.g., on a scale of 1 (poor) to 5 (great). An evaluation score of the didactic file can be a mean of the inputs evaluating the didactic file, e.g., once a minimum number of evaluations has been received. As described above, a greater evaluation score makes the computer 102, 104, 106 more likely to select the didactic file for the second user.

Figure 5:
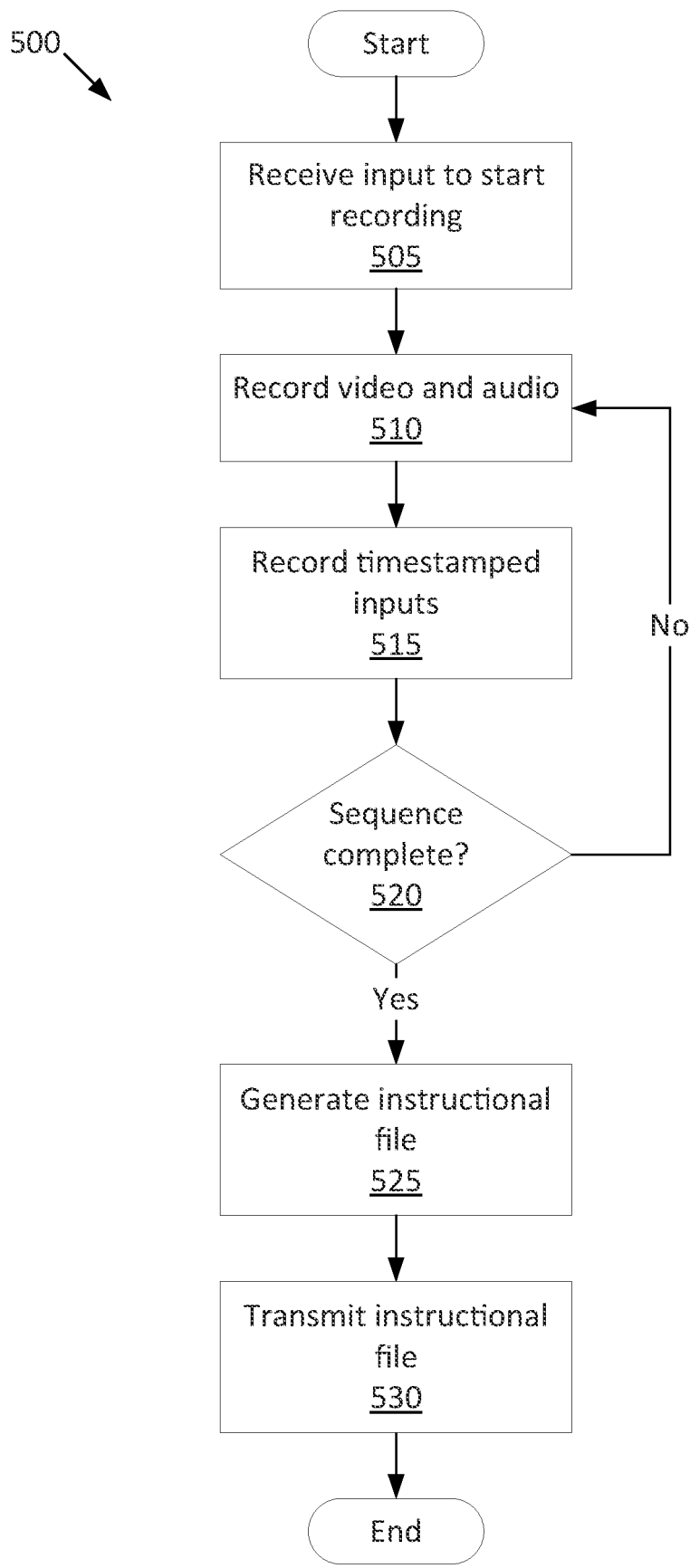
FIG. 5 is a process flow diagram of an example process for generating a didactic file including the video.

FIG. 5 is a process flow diagram illustrating an exemplary process 500 for generating the didactic file. The memory of the computer 102, 104, 106 stores executable instructions for performing the steps of the process 500 and/or programming can be implemented in structures such as mentioned above. As a general overview of the process 500, upon receiving an input to start recording the first video, the computer 102, 104, 106 records the first video and records the times of the inputs until a sequence of the inputs is complete. The computer 102, 104, 106 generates the didactic file and transmits the didactic file to the video library.

The process 500 begins in a block 505, in which the computer 102, 104, 106 receives an input instructing the computer 102, 104, 106 to begin recording the first video, as described above.

Next, in a block 510, the computer 102, 104, 106 records the first video, including audio, as described above.

Next, in a block 515, the computer 102, 104, 106 records times and identities of the inputs provided by the first user, as described above.

Next, in a decision block 520, the computer 102, 104, 106 determines whether a sequence of the inputs is complete, i.e., whether all the inputs for the first video have been provided by the first user. For example, the computer 102, 104, 106 can determine whether the computer 102, 104, 106 has received an input from the first user to cease recording the first video. For another example, the computer 102, 104, 106 can determine whether a most recent input is a terminal input, e.g., an input at an end of a menu structure or an input that does not prompt the vehicle computer 102 to provide options to the first user. If the sequence of the inputs is not complete, the process 500 returns to the block 510 to continue recording the first video and the inputs. If the sequence of the inputs is complete, the process 500 proceeds to a block 525.

In the block 525, the computer 102, 104, 106 generates the didactic file, i.e., generates the second video and the macro and consolidates the first video, the second video, and the macro into the didactic file, as described above.

Next, in a block 530, the computer 102, 104, 106 transmits the didactic file to the video library, as described above. After the block 530, the process 500 ends.

Figure 6:
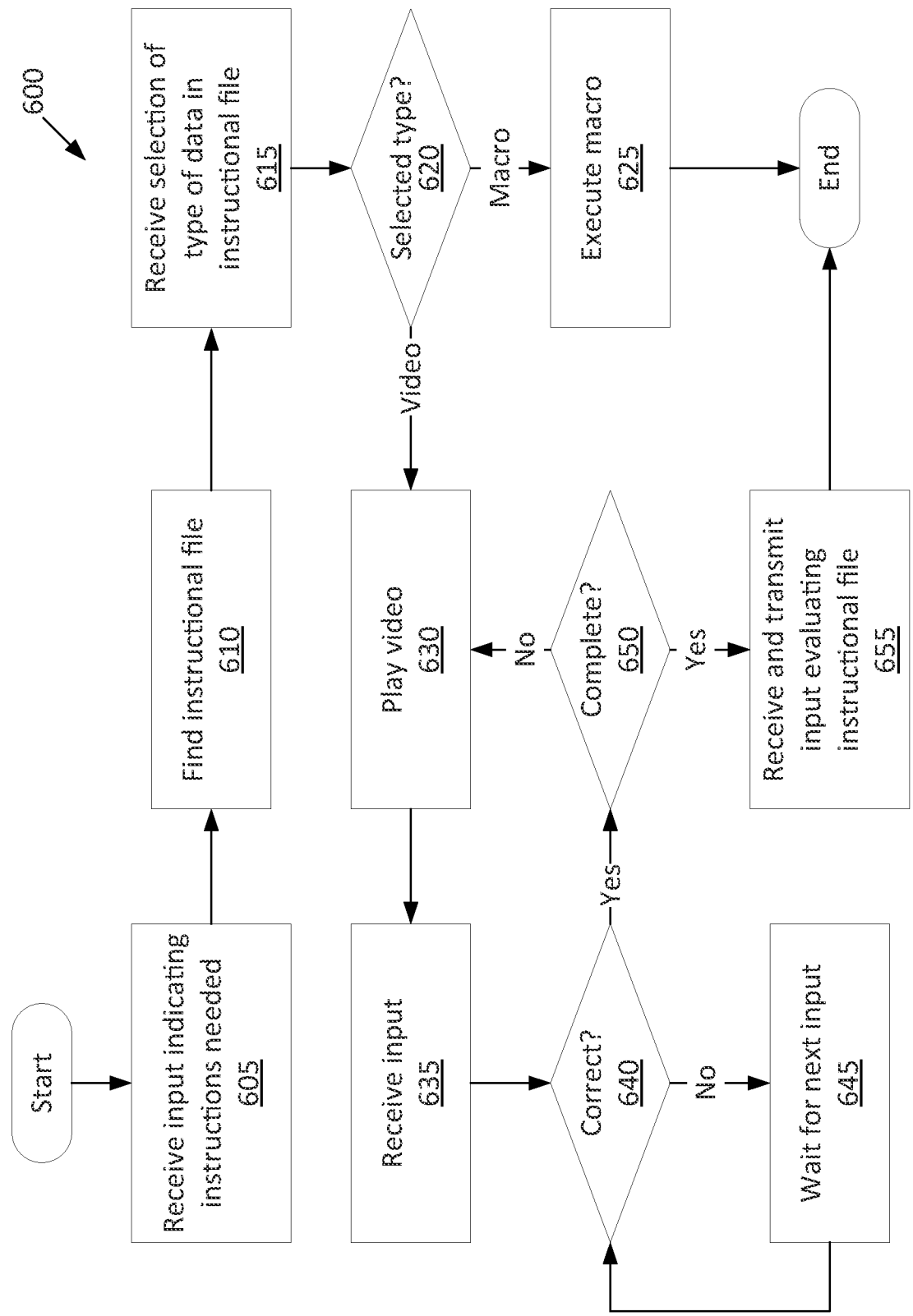
FIG. 6 is a process flow diagram of an example process for playing the didactic file.

FIG. 6 is a process flow diagram illustrating an exemplary process 600 for playing the didactic file for the second user. The memory of the computer 102, 104, 106 stores executable instructions for performing the steps of the process 600 and/or programming can be implemented in structures such as mentioned above. As a general overview of the process 600, upon receiving an input indicating that instructions are needed by the second user, the computer 102, 104, 106 selects the didactic file. If the second user selects the macro from the didactic file, then the computer 102, 104, 106 executes the macro. If the second user selects the first or second video, the computer 102, 104, 106 plays the first or second video. The computer 102, 104, 106 can pause the first or second video at each of the times until the second user provides the correct input corresponding to that time. Once the first or second video is complete, the computer 102, 104, 106 receives input evaluating the didactic file.

The process 600 begins in a block 605, in which the computer 102, 104, 106 receives an input indicating that instructions are needed. For example, the input can be a keyword search of the video library, as described above. For another example, the input can be a sequence of inputs for which the trained network outputs an intended command different than the command produced by the sequence, as described above.

Next, in a block 610, the computer 102, 104, 106 selects the didactic file based on the input provided in the block 605, as described above. The computer 102, 104, 106 can then prompt the second user to select the macro, the first video, or the second video.

Next, in a block 615, the computer 102, 104, 106 receives the selection of the macro, the first video, or the second video from the second user.

Next, in a decision block 620, the computer 102, 104, 106 determines the selection from the block 615. If the second user selected the macro, the process 600 proceeds to a block 625. If the second user selected the first video or the second video, the process 600 proceeds to a block 630.

In the block 625, the computer 102, 104, 106 executes the macro, as described above. After the block 625, the process 600 ends.

In the block 630, the computer 102, 104, 106 plays the first video or the second video, according to the selection received in the block 615. While playing the first or second video, the computer 102, 104, 106 pauses at a next time of the times in the metadata of the first or second video, as described above.

Next, in a block 635, the computer 102, 104, 106 receives a next input from the second user.

Next, in a decision block 640, the computer 102, 104, 106 determines whether the input provided in the block 635 matches the input provided by the first user at the time at which the first or second video is paused when recording the first video, as described above. If the inputs do not match, the process 600 proceeds to a block 645. If the inputs match, the process 600 proceeds to a decision block 650.

In the block 645, the computer 102, 104, 106 waits for the second user to provide another input. The computer 102, 104, 106 may replay a previous portion of the first or second video, as described above. After the block 645, the process 600 returns to the decision block 640.

In the decision block 650, the computer 102, 104, 106 determines whether the first or second video is complete, i.e., whether the first or second video has played to the end. If the first or second video is not complete, the process 600 returns to the block 630 to continue playing the first or second video to the next time in the metadata. If the first or second video is complete, the process 600 proceeds to a block 655.

In the block 655, the computer 102, 104, 106 receives an input evaluating the didactic file, as described above. The computer 102, 104, 106 can store the evaluation in the video library. After the block 655, the process 600 ends.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory storing instructions executable by the processor to:
   record a first video of inputs to respective controls of a user interface of a vehicle;

add metadata to the first video of respective times at which the respective inputs are provided;
generate a second video based on the first video and the metadata, the second video showing the user interface with a user who provided the inputs being absent and visually highlighting the respective controls corresponding to the respective inputs at the respective times;
play the second video; and
while playing the second video, pause the second video at the respective times.

2. The computer of claim 1, wherein the instructions further include instructions to receive the metadata of the respective times from a communications network of the vehicle.

3. The computer of claim 1, wherein the first video includes audio recorded of the user who provided the inputs.

4. The computer of claim 3, wherein the second video includes the audio from the first video.

5. The computer of claim 1, wherein the instructions further include instructions to generate a macro of the respective inputs at the respective times.

6. The computer of claim 5, wherein the instructions further include instructions to receive a selection of at most one of the second video or the macro, play the second video upon receiving the selection selecting the second video, and execute the macro upon receiving the selection selecting the macro.

7. The computer of claim 6, wherein the selection is of at most one of the second video, the macro, and the first video, and the instructions further include instructions to play the first video upon receiving the selection selecting the first video.

8. The computer of claim 1, wherein the instructions further include instructions to, when the second video is paused at a first time of the times, unpause the second video upon receiving a second input that is the same as a first input received at the first time while recording the first video.

9. The computer of claim 1, wherein the instructions further include instructions to, when the second video is paused at a first time of the times, replay a previous portion of the second video upon receiving a second input that is different than a first input received at the first time while recording the first video.

10. The computer of claim 1, wherein the user is a first user, and the instructions further include instructions to receive a selection from a second user of at most one of the first video or the second video, play the first video upon receiving the selection selecting the first video, and play the second video upon receiving the selection selecting the second video.

11. The computer of claim 1, wherein the inputs are first inputs, and the instructions further include instructions to receive second inputs, and output a prompt to view the second video based on the second inputs.

12. The computer of claim 11, wherein the second inputs are commands other than to view the second video.

13. The computer of claim 11, wherein the instructions further include instructions to select the second video from a video library based on the second inputs.

14. The computer of claim 13, wherein selecting the second video from the video library includes executing a trained network on the second inputs.

15. The computer of claim 14, wherein the user is a first user, and the trained network is trained to identify a command that a second user intended to select and failed to select with the second inputs, and selecting the second video is based on the command.

16. The computer of claim 13, wherein the instructions further include instructions to, upon generating the second video, upload the second video to the video library that is remote from the vehicle.

17. The computer of claim 1, wherein the controls include at least one of a button, a knob, and a portion of a touchscreen.

18. A method comprising:
recording a first video of inputs to respective controls of a user interface of a vehicle;
adding metadata to the first video of respective times at which the respective inputs are provided;
generating a second video based on the first video and the metadata, the second video showing the user interface with a user who provided the inputs being absent and visually highlighting the respective controls corresponding to the respective inputs at the respective times;
playing the second video; and
while playing the second video, pausing the second video at the respective times.

* * * * *